V. A. GIANETT.
CAMERA.
APPLICATION FILED DEC. 9, 1920.
1,428,431.
Patented Sept. 5, 1922.
2 SHEETS—SHEET 1.
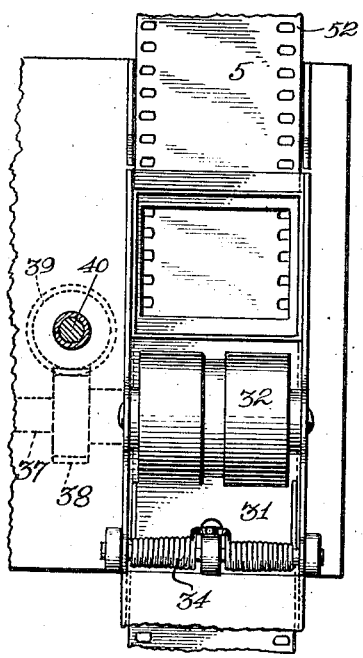
Fig. 3.
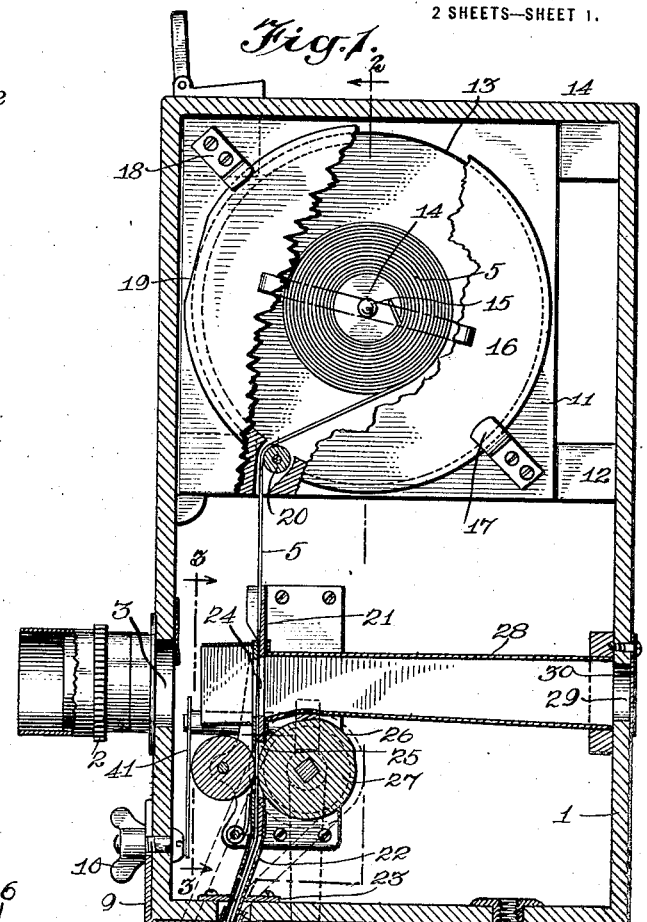
Fig. 1.
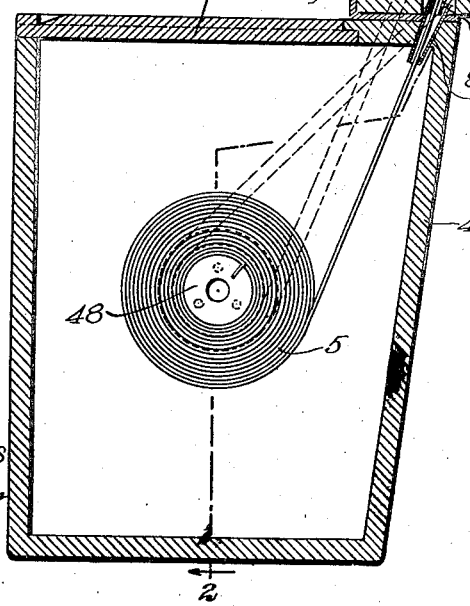
WITNESSES
Geo Naylor
A. L. Kitchin
INVENTOR
VICTOR A. GIANETT
BY
ATTORNEYS

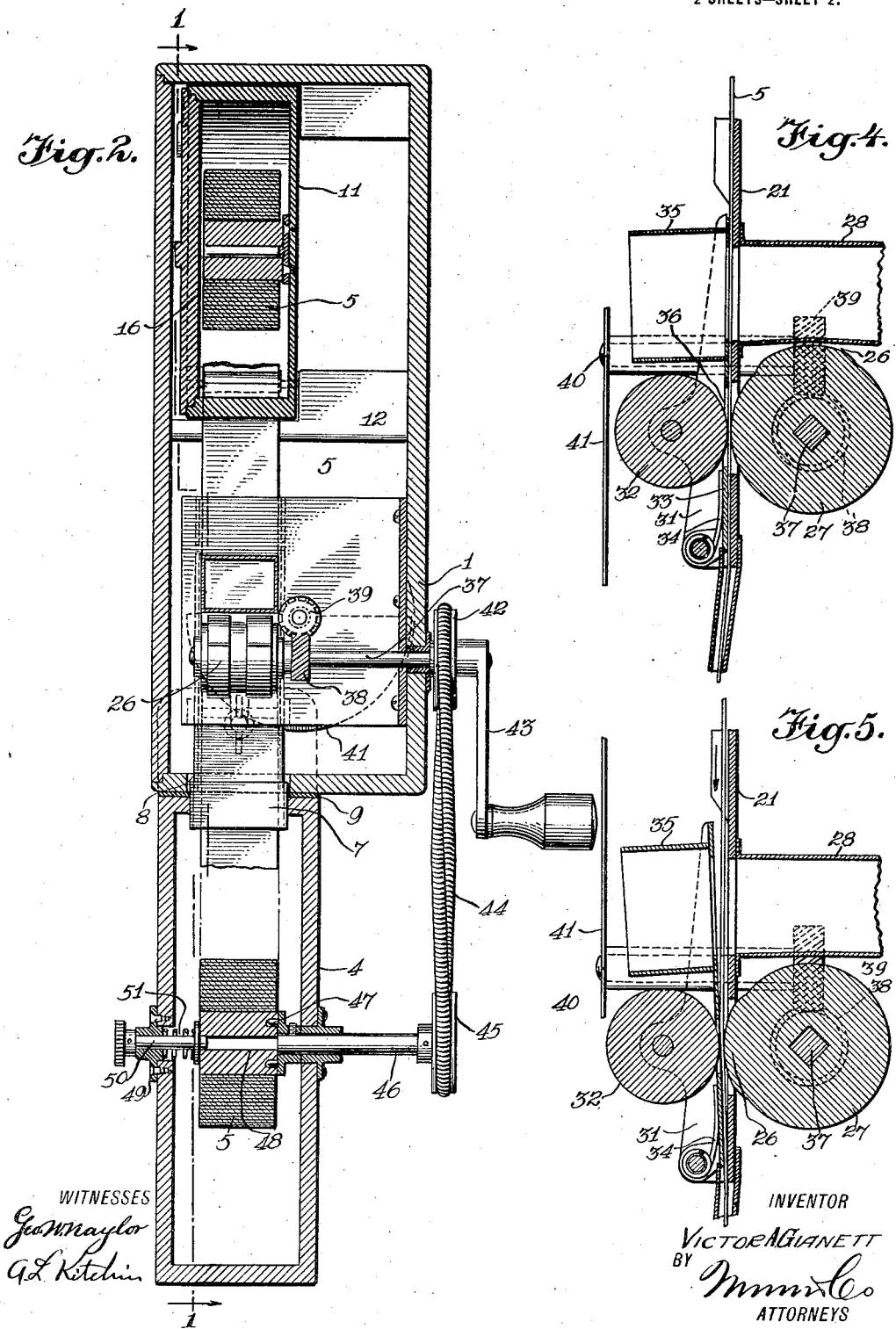

Patented Sept. 5, 1922.

1,428,431

UNITED STATES PATENT OFFICE.

VICTOR A. GIANETT, OF NEW YORK, N. Y.

CAMERA.

Application filed December 9, 1920. Serial No. 429,458.

*To all whom it may concern:*

Be it known that I, VICTOR A. GIANETT, a citizen of the United States, and a resident of the city of New York, borough of Manhattan, in the county of New York and State of New York, have invented a new and improved Camera, of which the following is a full, clear, and exact description.

This invention relates to cameras and particularly to a simple inexpensive moving picture camera and has as one of its objects to present a construction which will secure so called moving pictures either on a film or on a sensitized strip of paper or other material.

Another object of the invention is to provide a camera of the moving picture type wherein the parts are extremely simple in construction and few in number, while at the same time they are designed to positively operate in the desired manner.

A further object of the invention is to provide a camera which will take a succession of snap shots either on a film or directly on a sensitized strip of paper.

A further object more specifically is to provide a moving picture camera which is adapted to produce strips of small pictures in a very short time and at a small expense.
In the accompanying drawings—

Figure 1 is a longitudinal vertical sectional view through a camera disclosing an embodiment of the invention, the same being taken approximately on line 1—1 of Figure 2.

Figure 2 is a vertical sectional view through Figure 1 on line 2—2.

Figure 3 is a fragmentary sectional view through Figure 1 on line 3—3, the same being on an enlarged scale.

Figure 4 is a fragmentary sectional view on an enlarged scale showing the construction and arrangement of the feed rollers and certain adjacent parts.

Figure 5 is a view similar to Figure 4 but disclosing the parts in the act of moving the film or sensitized paper.

Referring to the drawings by numerals, 1 indicates a box or casing of any desired kind which is designed to receive the various operating parts of the camera except the lens 2 which is connected to the casing 1 opposite the opening 3. Arranged below casing 1 is an auxiliary casing 4 for receiving the exposed paper or film 5. This casing is provided with a sliding cover 6 which may be removed when it is desired to remove the exposed film. An entrance guide 7 is connected to the casing 4 near one corner, said guide being preferably a strip of metal with a narrow mouth at the inner end which mouth is slightly larger than the film or paper tape to be passed therethrough.

As shown in Figure 1 the guide 7 projects a short distance into the aperture 8 formed in the casing 1 and also the casing 4 is connected with a bracket 9 clamped to the casing 1 by a suitable clamping screw 10 whereby the casing 4 may be quickly and easily removed at any time. If the parts are in the position shown in Figure 1 and it should be desirable to finish the exposed film 5, the bolt 10 will be loosened and the casing 4 would be moved downwardly a short distance whereupon part of the film will be exposed and said exposed part will be severed by tearing or by being cut. The casing 4 together with the exposed film 5 is then taken into a suitable dark room and the exposed film or tape 5 is developed in the desired manner.

By reason of the construction and arrangement of the guide 7, very little light can penetrate into the casing 4 and usually it is sufficient to bend over the torn end of the film or tape 5 and move the said end into the outer end of the guide 7. Usually the member 5 is a paper tape sensitized on one surface though it might be an ordinary film if desired.

The entire camera is intended for amusement parks and the like and, consequently, the sensitized surface is not such as to quickly become light struck so that the arrangement of casing 4 and guide 7 is sufficient under the circumstances.

In casing 1 is provided a container 11 held in place by suitable guides 12, said container having a bore 13 for receiving the unexposed tape 5 which is mounted on a suitable drum 14 freely rotatable on the pin 15 and a covering plate 16 normally covering the bore 13 and held in place by suitable over-hanging clips 17 and 18. The cover 16 is cut away at 19 so that when opposite either of the clips the cover may be removed. As indicated in Figure 1, the unexposed film 5 passes from the drum 14 over a roller 20 and from thence over the guide plate 21 to what may be termed a guide chute 22 which guide chute is a hollow member adapted to project into the upper end of the guide 7 when the parts are arranged as shown in Figure 1. The guide chute 22 may be rigidly secured to or formed integral with the plate 23 secured by screws or other means to casing 1. The guide plate 21 has a focusing opening 24 and a feed opening 25 through which the raised section 26 of roller 27 projects when the roller is moving the tape 5. A hollow member 28 connected with the plate 21 extends through the rear of the casing 1 and registers at the rear with opening 29 normally closed by a manually actuated cover or shutter 30. Preferably the tape 5 is of some translucent material so that when properly sensitized the person may look through the opening 29 and see the image of the object to be photographed.

In order that the tape 5 may be properly fed through the machine and also properly clamped in a stationary position when being exposed, a pivotally mounted frame 31 carrying a roller 32 is associated with the roller 27 (Figs. 4 and 5). The frame 31 is provided with a contact plate 33 designed to press against the tape 5 and press said tape against the guide plate 21 whereby the film is held stationary. A spring 34 acts to normally hold the frame 31 so that plate 33 will press tightly against the tape 5. This plate carries adjacent its upper end a hood 35 for preventing any accidental light rays striking the film. The roller 32 extends into the opening 36 in plate 33 and barely touches the film when the parts are in the position shown in Figure 4. When the roller 27 is rotated to the position shown in Figure 5, the section 26 will press the tape 5 against the roller 32 and will, consequently, move the tape downwardly while the roller 32 rotates. In addition, roller 32 together with frame 31 is swung over to the position shown in Figure 5 against the action of spring 34 where upon plate 33 releases the tape 5 and permits it to freely move downwardly. The length of the section 26 is such that during one action thereof the tape 5 is moved downwardly one exposure and it will, therefore, be seen that upon each rotation of the roller 27, one exposure is made. In order that the light from the lens 2 may be shut off while the film is moving, a shaft 37 connected with roller 27 carries a gear 38 meshing with a gear 39 which latter gear is secured to a shaft 40. A shutter 41 is rigidly secured to shaft 40 and is made of a proper shape to shut off the light at the proper time, said shape usually being approximately a half of a disc. The shaft 37 extends from the roller 27 through the gear 38 and from thence through the casing 1 a short distance beyond said casing whereby the pulley 42 may be rigidly secured thereto and crank 43 may be fitted thereon so as to turn said shaft freely. A belt 44 of any desired type, as for instance, a spring belt, passes over pulley 42 and over a second pulley 45 rigidly secured to shaft 46 extending through part of casing 4 and provided with pins 47 for engaging suitable apertures in the spool 48. A spring pressed washer 49 holds the spool 48 in engagement with the pins 47, said washer being guided by the rod 50 and also moved in one direction thereby while the spring 51 moves in the opposite direction.

The arrangement just described is provided in order that when a considerable length of film or tape has been exposed, it will be readily wound in the proper manner for later development. As shown in Figure 3, tape 5 is provided with a row of apertures 52 adjacent each edge, said apertures resembling the apertures in the standard type of moving picture film. As far as the present machine is concerned, these apertures are unnecessary but are usually provided in order to give the appearance of a strip of moving picture exposures. Preferably the tape 5 is paper and the device is intended especially for use in picnic parties, outings and at pleasure resorts where one or more feet of film is taken of one object. The finished series or string of pictures presents the appearance to a casual observer of a regular standard moving picture print. Usually the pictures are slightly larger and by reason of the simple feed shown in Figures 4 and 5 the pictures would not register sufficiently to be used in a projecting machine with any degree of success.

When the device is in use a tripod is connected with the casing 1 by having a suitable bolt therein screwed into the sleeve 53. If desired, the object may move to a position in front of the camera or the camera may be set opposite to the object and in order to be sure that the proper focus is secured, the operator may look through the opening in the window 29.

The lens 2 is preferably a short range lens and has a universal focus from about four feet to twelve feet though a different lens could be substituted without departing from the spirit of the invention.

After the camera or the object has been properly positioned, the operator merely turns the crank 43 and successive exposures are made on the strip 5. When the desired number of exposures have been made, casing 4 is removed slightly and the film torn off adjacent the guide 7. The exposed film or tape is then properly developed. Where the tape is a piece of paper sensitized the developing and focusing is done in the usual manner for producing prints and the original strip 5 having the exposures thereon is then complete.

What I claim is:—

1. In a moving picture machine, a film feed including a guide plate formed with an opening, a frame pivoted at one end in juxtaposition to the plate, means normally urging the frame toward the plate for clamping the film therebetween, said frame having an opening aligning with the opening of the plate, said plate and frame also provided with additional aligned openings, a feeding mechanism arranged to cooperate with the film at the latter openings and adapted to press against and move the film longitudinally and at the same time move the film and frame laterally causing said frame to move away from the film for releasing the same as the film is moved, said frame automatically returning to a clamping position for holding the film stationary during the exposure thereof.

2. In a moving picture machine, a film feed including a guide plate formed with an opening and adapted to receive a strip of sensitized material or film, a clamping frame pivoted at the lower end of the plate and in front thereof, means normally urging the clamping frame toward the plate for clamping the film therebetween, said frame having an opening aligning with the opening of the plate, said plate and frame also provided with aligned openings beneath the aforesaid exposure openings, a feeding mechanism arranged to cooperate with the film and comprising a pair of rollers, one of said rollers having a raised peripheral section adapted to press against said film and move the film longitudinally and at the same time laterally as said roller is rotated, means for rotating said roller, the other roller being journaled across said frame so that both rollers contact with the film through the last mentioned openings, the contact of the raised section of the first named roller with the film and second named roller causing said frame to move away from the film for releasing the same as the film is moved by and between the rollers intermittently, said frame automatically returning to a clamping position for holding the film stationary during the exposure thereof.

VICTOR A. GIANETT.